United States Patent Office 3,627,558

Patented Dec. 14, 1971

3,627,558

SENSITIZATION PROCESS FOR ELECTROLESS PLATING

Lenard Lee Roger, Camberley, Russell Swale Vincent, Aldbourne, and Harry Wilson, Sandhurst, England, assignors to Technograph Printed Circuits Limited No Drawing. Filed Nov. 27, 1968, Ser. No. 779,590
Int. Cl. B44d *1/18*; C23c *3/00*
U.S. Cl. 117—47 R 12 Claims

ABSTRACT OF THE DISCLOSURE

Method of, and compositions for, sensitising surfaces prior to electroless plating of a metal thereon. The compositions are stabilised by a water-soluble hydroxyl group-containing compound.

The present invention is concerned with a process for sensitizing surfaces for the reception of a layer of electroless plated metal and with compositions for use in this process.

Electroless (or currentless) plating, particularly of copper, is used in the manufacture of printed circuits either alone or as a preliminary to electroplating the bulk of the conductive metal which forms the circuit and is necessary when any part of the surface to be electroplated is formed of a nonconductive material, in particular when it is required to form plate-through holes in the non-conductive support of the printed circuit, which holes enable inter-connections to be made between layers.

Electroless plating is effected when an aqueous solution of a water-soluble salt of the metal to be plated, a water-soluble reducing agent for said salt, and various water-soluble additives which improve the quality of the electroless deposit, stabilise the solution, etc. Even with the most carefully formulated electroless plating solutions, however, it is necessary to sensitize the surface to be plated if a well adherent deposit is to be obtained at a commercially acceptable plating rate.

The sensitizing solutions which are at present preferred for this purpose are aqueous solutions containing two essential ingredients, the first being a stannous salt, usually stannous chloride, and the second being a precious metal salt, usually a chloride, the precious metal being palladium, gold, rhodium, osmium or iridium. Preferred solutions of this kind are those described in Britsh specification No. 942,850. In this patent the concentration of the precious metal ion in the sensitizing solution bath may vary within the range of 0.01 g. to 5.0 g. per liter of solution and the stannous ion concentration must be maintained in excess of the stoichiometric amount based on the amount of precious metal ions present in the sensitizing solution. The precious metal salt is sometimes referred to as a seeder and the stannous salt alone as a sensitizer, but we will, for convenience, refer to the solution containing both salts as a sensitizing solution. A major disadvantage of such solutions is that they are unstable and have only a limited life; over a period of, say, 1 or 2 weeks the precious metal separates from the solution as a metallic film on the surface of the solution and as a granular precipitate. If the solution in this state is used to sensitize surfaces for subsequent electroless plating by immersing the surfaces in the solution, on removing the surface from the solution, it is usually found to be coated with a layer of the precious metal which cannot easily be removed by rinsing. If electroless plating is effected without removing the precious metal coating, the plating metal has poor adhesion to the underlying surface.

We have now found that the stability and storability of sensitizing solutions containing a precious metal salt and a stannous salt can be greatly improved by the incorporating in such solutions of water-soluble hydroxyl group-containing organic compounds. A wide variety of both aliphatic and aromatic hydroxyl group-containing organic compounds can be used for this purpose.

According to the present invention, therefore, we provide a stabilized aqueous sensitizing solution for sensitizing surfaces prior to electroless metal plating and containing a precious metal salt and a stannous salt, said solution also containing a water-soluble hydroxyl group-containing organic compound as stabilizer.

In the case of the aliphatic compounds we have tested, we have found that there is a minimum concentration below which the compound does not have a stabilizing effect; this minimum value varies from compound to compound and can readily be determined by routine experiments. Examples of aliphatic compounds which we have found to have a pronounced stabilizing effect and the minimum concentrations at which they are effective are as follows:

Ethylene glycol—25% v./v.
Isopropyl alcohol—25% v./v.
Glycerol—12.5% v./v.
Sucrose—40 g./l.

It is not, of course, necessary to use these compounds in their minimum effective concentrations and higher concentrations can, and normally will, be used.

Although aliphatic compounds are effective, as indicated above, we prefer to use hydroxyl group-containing aromatic compounds as they have a more pronounced stabilizing effect and do not, in general, exhibit a concentration threshold for effectiveness, that is there is a direct relationship between the concentration and the stabilizing effect obtained at all concentrations. We prefer to use compounds of this type which are more water-soluble than phenol itself, i.e. benzene and naphthalene derivatives containing two or more nuclear-substituted hydroxy groups or one or more nuclear-substituted hydroxy groups and one or more other water-solubilizing nuclear substituents, such as sulphonic acid groups. Suitable aromatic stabilizing compounds are, for example: resorcinol, sulphonated phenol, catechol, quinol, pyrogallol and phloroglucinol.

The maximum concentration of both the aliphatic and aromatic compounds that can be used is generally only limited by their solubility in the aqueous sensitizing solution. For economic reasons it is normally preferred to use the minimum concentration of the stabilizing compound which gives the desired stability and storability. In the case of the aromatic compounds, preferred concentrations are in the range 30 to 50 g./l.

Preferred concentrations for the aliphatic compounds mentioned above are as follows:

isopropyl alcohol—450 ml./l.
ethylene glycol—700 ml./l.
glycerol—400 ml./l.
sucrose—300 g./l.

The sensitizing solution itself preferably comprises:

precious metal chloride—0.2 to 2 g./l.
stannous chloride—20 to 80 g./l.
37% aqueous hydrochloric acid—25 to 250 ml./l.

In order to be effective, sensitizing must be carried out on a surface which is scrupulously clean and, where a part or the whole of the surface is formed of metal, free from metal oxides. We have developed a cleaning and etching schedule which is particularly suitable for use prior to sensitization with the above-described stabilized sensitizing solutions, but which is also suitable for use with other sensitizing solutions. This schedule comprises the following steps:

(i) abrasive scrubbing (only if the surface is heavily soiled),
(ii) etching/degreasing treatment,
(iii) metal oxide removal (if the surface is partly or wholly formed of metal),
(iv) optional-hydrochloric acid (and, if desired, stannous chloride) solution rinse.

Following the last stage of this schedule, the surface is immersed in the sensitizing solution. The stages of this cleaning and etching schedule will now be described in greater detail.

(i) This stage is only carried out when the surface is heavily soiled; if this is so the surface is scrubbed with a brush and an abrasive powder. The surface is then thoroughly rinsed with water so as to remove solid material from any holes or cracks.

(ii) Etching and degreasing are effected simultaneously by immersing the surface in an aqueous solution containing a water-soluble ammonium salt, such as ammonium carbonate or sulphate, and a surfactant of the quaternary organic amine salt type, such as cetyl pyridinium bromide, and, if desired, additional ammonia, which solution is preferably at an elevated temperature below its boiling point. Preferred etching/degreasing solutions and their preferred operating temperatures are as follows:

(a)

ammonium carbonate—5–150 g./l.
cetyl pyridinium bromide—0.1–2.0 g./l.
temperature—50–60° C.

(b)

ammonium sulphate—5–20 g./l.
ammonia solution—3–30 ml./l.
cetyl pyridinium bromide—0.1—1.0 g./l.
temperature—30–50° C.

Particularly preferred etching/degreasing solutions and their operating temperatures are as follows:

(c)

ammonium carbonate—100 g./l.
cetyl pyridinium bromide—1.0 g./l.
temperature—53 to 57° C.

(d)

ammonium sulphate—150 g./l.
ammonia solution (density 0.88 g./cm.$^3$)—50 ml./l.
cetyl pyridinium bromide—2.0 g./l.
temperature—38 to 42° C.

After immersion in this solution, the surface is again thoroughly rinsed in water to remove all traces of the etching/degreasing solution.

(iii) Metal oxide present on the surface (which will, of course, only be the case when the surface is wholly or partly formed of metal) is then removed by immersion in an aqueous solution containing a chelating agent, the solution being at an elevated temperature below its boiling point. The chelating agent may be any of those which are capable of chelating the metal(s) present in the surface and suitable chelating agents for a wide variety of metals are known. Where the surface is partly or wholly formed of copper, suitable chelating agents include the disodium salt of ethylene diamine tetracetic acid (EDTA), dipotassium tartrate and citric acid. Preferred copper oxide removing solutions and their preferred operating temperatures are as follows:

(a)

EDTA disodium salt—1–30 g./l.
temperature—45–60° C.

(b)

dipotassium tartrate—5–25 g./l.
temperature—30–50° C.

(c)

citric acid—5–25 g./l.
ammonia to pH 9–10
temperature—50–60° C.

Particularly preferred copper oxide removing solutions and their operating temperatures are as follows:

(e)

EDTA disodium salt—10 g./l.
temperature—50 to 55° C.

(f)

dipotassium tartrate—25 g./l.
temperature—40° C.

(g)

citric acid—25 g./l.
ammonia to pH 9
temperature—55° C.

After removal of the metal oxide, the surface is again rinsed in water.

(iv) It is preferred, but not essential, to immerse the surface in an aqueous solution containing from 20–200 ml./l. of 37% aqueous hydrochloric acid and preferably additionally containing from 5–15 g./l. of stannous chloride as the final stage of the schedule before immersion in the sensitizing solution. A particularly preferred solution is as follows:

stannous chloride—10 g./l.
hydrochloric acid (37%)—100 ml./l.

In order that the invention may be fully understood, the following examples are given by way of illustration only.

EXAMPLE 1

Copper-clad panels for use in the manufacture of printed circuits were subjected to the following cleaning and etching schedule before being immersed in a sensitizing solution prior to an electroless plating treatment.

(i) The panels were scrubbed with 240 grade pumice (i.e. passing through a standard sieve of 240 meshes per inch) and water for at least one minute, the scrubbing time depending on the degree of soiling of the panels.

(ii) The scrubbed panels were racked vertically for from 5 to 10 minutes in an etching/degreasing solution containing:

| | G./l. |
|---|---|
| Ammonium carbonate | 100 |
| Cetyl pyridinium bromide | 1 |

The solution was maintained at a temperature of from 53 to 57° C. and was not specially agitated, natural convection of the solution being sufficient.

(iii) The etched/degreased panels were immersed in a metal oxide removing solution containing:

EDTA disodium salt—10 g./l.

at a temperature of from 50 to 55° C. The duration of this process can vary from 5 minutes to several hours and, for production convenience, the panels can be held in this solution until required.

(iv) The panels from the previous step were immersed for one minute in a solution containing:

stannous chloride—10 g./l.
hydrochloric acid (37%)—100 ml./l.

at room temperature and were then transferred directly into the sensitizing solution.

EXAMPLE 2

Panels treated by a cleaning and etching process such as that described in Example 1 were immersed in a sensitizing solution consisting of:

palladium chloride—0.8 g./l.
stannous chloride—30 g./l.
hydrochloric acid (37%)—150 ml./l.
ethylene glycol—700 ml./l.
water—remainder After immersion for from 10 to 15 minutes it was found that satisfactory deposits could be formed on the panels by electroless plating. The solution was found to be active after exposure to the atmosphere for six months.

EXAMPLE 3

Panels treated by a cleaning and etching process such as that described in Example 1 were immersed in a sensitizing solution consisting of:

palladium chloride—0.5 g./l.
stannous chloride—25 g./l.
hydrochloric acid (37%)—150 ml./l.
isopropyl alcohol—450 ml./l.
water—remainder After immersion for 10 minutes it was found that satisfactory deposits could be formed on the panels by electroless plating. The sensitizing solution was found to have particularly good wetting and penetrating power.

EXAMPLE 4

Panels treated by a cleaning and etching process such as that described in Example 1 were immersed in a sensitizing solution consisting of:

palladium chloride—1.0 g./l.
stannous chloride—50 g./l.
hydrochloric acid (37%)—400 ml./l.
resorcinol—50 g./l.
water—remainder After immersion for from 15 to 20 minutes it was found that satisfactory deposits could be formed on the panels by electroless deposition. The sensitizing solution was found to be active and stable for at least five months.

We claim:

1. A stabilized aqueous sensitizing solution for sensitizing copper or non-conductive surfaces prior to electroless plating, said solution containing a precious metal salt in an amount from 0.01 to 5.0 g. per liter of precious metal ions and a stannous salt in an amount to provide an excess over the stoichiometric amount of stannous ions based on the amount of precious metal ions, said solution also containing a water-soluble hydroxyl group-containing organic compound selected from the group consisting of ethylene glycol, 25% v./v.; isopropyl alcohol, 25% v./v.; glycerol, 12.5% v./v.; sucrose, 40 g./l., resorcinol, sulphonated phenol, catechol, quinol, pyrogallol and phloroglucinol, the concentration of said compound being at least that indicated.

2. A solution according to claim 1 which contains from 0.2 to 2 g./l. of precious metal chloride, from 20 to 80 g./l. of stannous chloride and from 25 to 250 ml./l. of 37% aqueous hydrochloric acid.

3. A solution according to claim 1 in which the hydroxyl group-containing organic compound is selected from the group consisting of ethylene glycol, 25% v./v.; isopropyl alcohol, 25% v./v.; glycerol, 12.5% v./v.; or sucrose, 40 g./l., the concentration of said compound being at least that indicated.

4. A solution according to claim 1, in which the hydroxyl group-containing organic compound is a member selected from the group consisting of resorcinol, sulphonated phenol, catechol, quinol, pyrogallol and phloroglucinol.

5. A solution according to claim 4 which contains from 30 to 50 g./l. of the hydroxyl group-containing aromatic compound.

6. A method of sensitizing copper or non-conductive surfaces prior to electroless metal plating, which comprises contacting the surface with a sensitizing solution containing a precious metal salt in an amount to provide from 0.01 to 5.0 g. per liter of precious metal ions and a stannous salt in an amount to provide an excess over the stoichiometric amount of stannous ions based on the amount of precious metal ions, said solution also containing a water-soluble hydroxyl group-containing organic compound or stabilizer selected from the group consisting of ethylene glycol, 25% v./v.; isopropyl alcohol, 25% v./v.; glycerol, 12.5% v./v.; sucrose, 40 g./l., resorcinol, sulphonated phenol, catechol, quinol, pyrogallol and phloroglucinol, the concentration of said compound being at least that indicated.

7. A method according to claim 6 in which, prior to sensitization, the surface is subjected to a cleaning and etching treatment which comprises (i) an etching and degreasing step effected by immersing the surface in an aqueous solution containing a water-soluble ammonium salt and a surfactant of the alkyl quaternary organic amine salt type and, if desired, additional ammonia and (ii), if the surface is partly or wholly formed of metal, a metal oxide removal step effected by immersing the surface in an aqueous solution constaining a chelating agent for the metal(s) present in the surface.

8. A method according to claim 7, in which the solution used to effect the etching and degreasing step contains from 5 to 150 g./l. of ammonium carbonate and from 0.1 to 2.0 g./l. of cetyl pyridinium bromide, said solution being used at a temperature of from 50 to 60° C.

9. A method according to claim 7, in which the solution used to effect the etching and degreasing step contains from 5 to 20 g./l. ammonium sulphate, from 3 to 30 ml./l. of ammonia solution and from 0.1 to 1.0 g./l. of cetyl pyridinium bromide, said solution being used at a temperature of from 30 to 50° C.

10. A method according to claim 7, in which the solution used to effect the metal oxide removal step contains from 1 to 30 g./l. of ethylene diamine tetraceic acid disodium salt and is used at a temperature of from 45 to 60° C.

11. A method according to claim 7, in which the solution used to effect the metal oxide removal step contains from 5 to 25 g./l. of dipotassium tartrate and is used at a temperature of from 30 to 50° C.

12. A method according to claim 7, in which the solution used to effect the metal oxide removal step contains from 5 to 25 g./l. of citric acid and sufficient ammonia to bring the pH of the solution to from 9 to 10 and is used at a temperature of from 50 to 60° C.

References Cited

UNITED STATES PATENTS

| | | | |
|---|---|---|---|
| 2,903,403 | 9/1959 | Strauss | 117—50 X |
| 2,958,610 | 11/1960 | Ramirez et al. | 117—50 |
| 3,056,746 | 10/1962 | Brightly | 117—50 X |
| 3,093,509 | 6/1963 | Wein | 117—47 X |
| 3,269,861 | 8/1966 | Schneble et al. | 117—213 X |
| 3,287,179 | 11/1966 | Frank | 117—50 X |

OTHER REFERENCES

Downey: "Organic Acids in Metal Cleaning and Finishing," Metal Finishing, volume 60, No. 10, pp. 50–57, October 1962.

RALPH S. KENDALL, Primary Examiner

C. WESTON, Assistant Examiner

U.S. Cl. X.R.

106—1; 117—47 A, 50, 212, 213